July 15, 1952          J. C. FERGUSON          2,603,418
ELECTRONIC INDICATOR TUBE
Filed Dec. 7, 1946                      2 SHEETS—SHEET 1
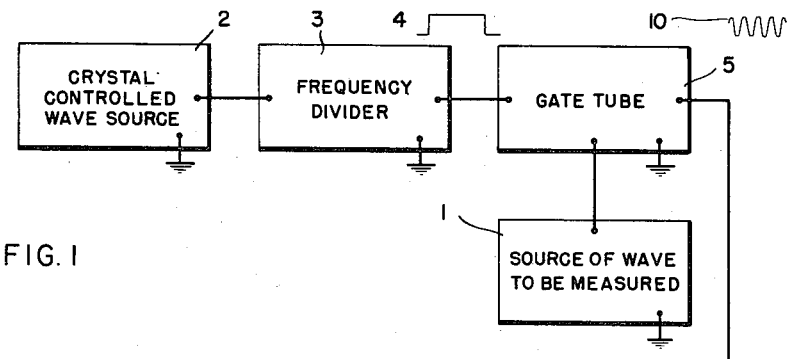
FIG. 1
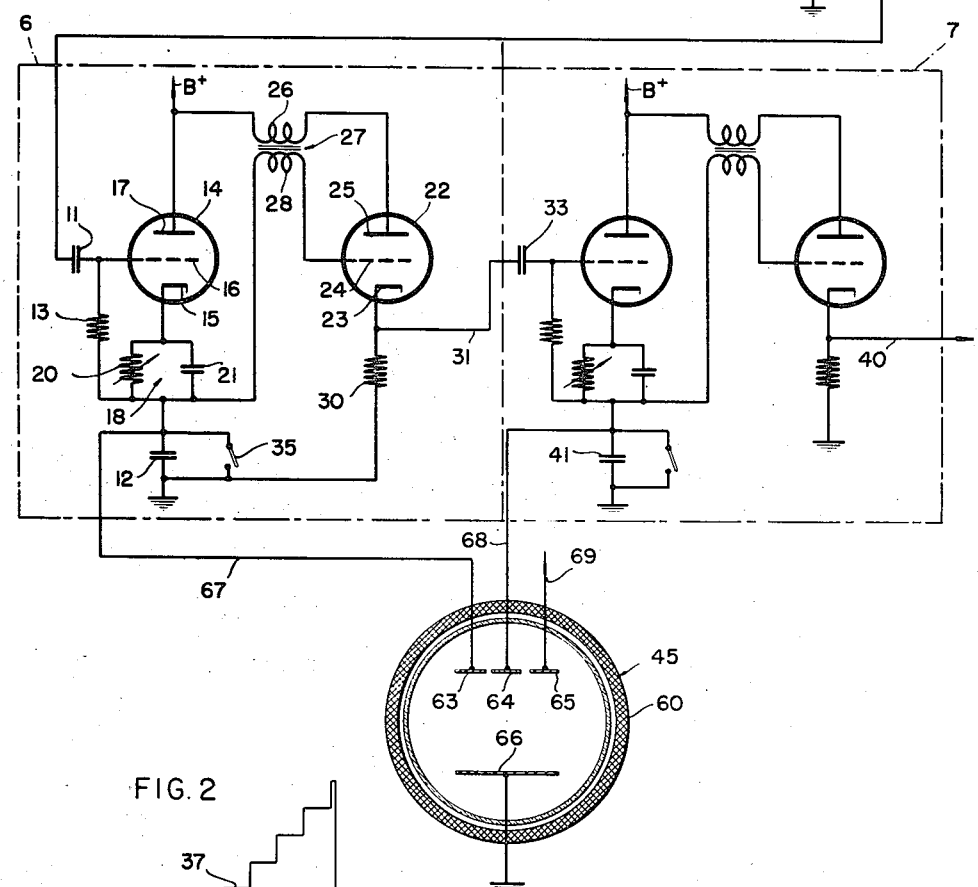
FIG. 2
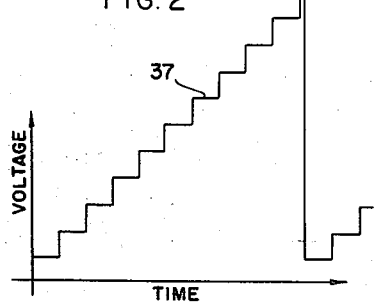
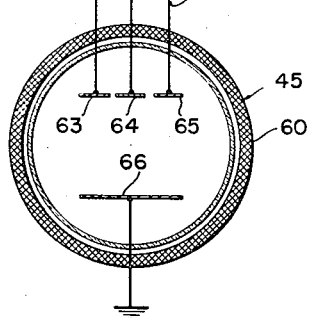
INVENTOR
JOSEPH C. FERGUSON
BY 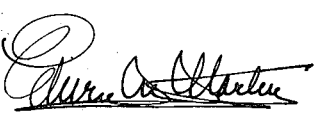
ATTORNEY July 15, 1952  J. C. FERGUSON  2,603,418
ELECTRONIC INDICATOR TUBE
Filed Dec. 7, 1946  2 SHEETS—SHEET 2
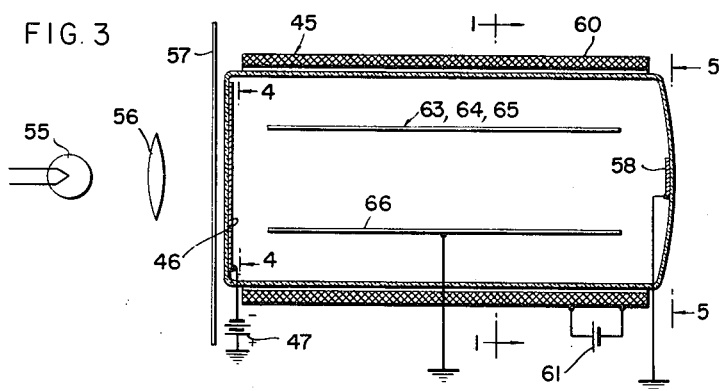
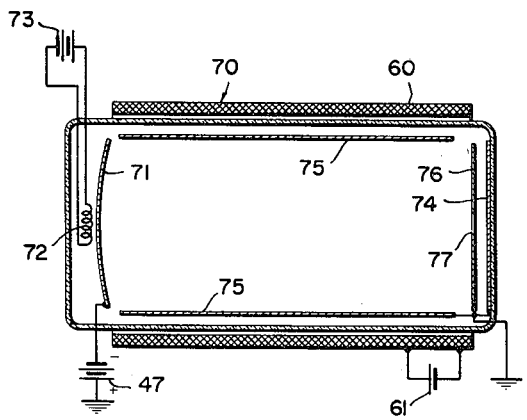
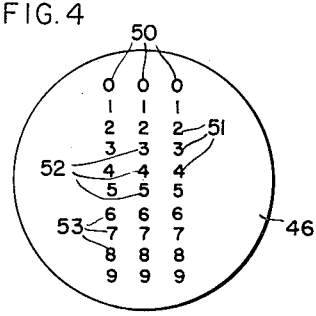
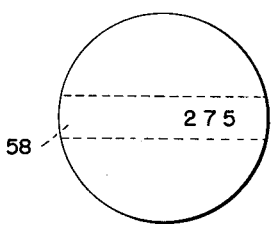
INVENTOR
JOSEPH C. FERGUSON
BY
ATTORNEY Patented July 15, 1952

2,603,418

UNITED STATES PATENT OFFICE 2,603,418

ELECTRONIC INDICATOR TUBE

Joseph C. Ferguson, Fort Wayne, Ind., assignor, by mesne assignments, to Farnsworth Research Corporation, a corporation of Indiana Application December 7, 1946, Serial No. 714,713

3 Claims. (Cl. 235—92)

This invention relates generally to a frequency measuring system, and particularly pertains to an electronic tube for visually exhibiting or indicating an electrical quantity such, for example, as a voltage representative of the frequency of a wave source of unknown frequency.

A frequency measuring system has been suggested where the number of waves developed by a source of unknown frequency is counted for a predetermined time interval. To this end a plurality of impulse counter circuits are connected in cascade to count the number of waves occurring during a fixed period of time, and individual volt meters are connected to the measuring condenser of each counter circuit to measure the voltage remaining on each condenser which in turn indicates the number of waves. A measuring system of this type may also be used for measuring short time intervals by counting the number of waves of a source of known frequency during that time interval. Alternatively, irregular pulses which may be developed, for example, by a Geiger-Müller counter in response to radioactive radiation may be counted in this manner for a predetermined period of time. This measuring system has the drawback that a separate volt meter is required for each counter circuit. The indications of the various volt meters must be converted into indications of time or frequency. It is desirable, therefore, to provide an indicator for visually and directly indicating the quantity to be measured such, for example, as a time interval or a frequency.

It has also been proposed to connect a number of decade counters in cascade, four frequency dividers or multivibrators being required for each decade counter. Each of the multivibrators includes a neon lamp which lights whenever the multivibrator has received two impulses, the four neon lamps of the decade counted indicating, respectively, the numerals 1, 2, 4 and 8. For each decade counter the numerals represented by the four neon lamps must be added to obtain the desired indication. This measuring circuit is therefore complicated in view of the large number of component circuit elements required and the desired indication such, for example, as the frequency of a wave can only be derived by computation.

It is an object of the present invention, therefore, to provide a novel electronic indicator tube for visually indicating an electrical quantity such, for example, as a voltage.

Another object of the invention is to provide a novel tube of the cathode ray type for visually exhibiting the frequency of a wave source of unknown frequency measured by counting the number of waves occurring during a predetermined length of time, or for indicating short time intervals which are measured by counting the number of waves of a source of known frequency during the time interval to be measured.

A further object of the invention is to provide an electronic indicator for selectively exhibiting letters, numerals or symbols indicating, for example, a voltage which may be representative of the frequency of a wave source or the like.

In accordance with the present invention there is provided an electronic indicator comprising a cathode including means for developing a plurality of electron beams. Each of the beams has a cross section representing a character such as a symbol, a letter, or a numeral. There are further provided a luminescent screen and means for focusing the electron beams on the screen. Finally, means are provided for selecting one of the electron beams and for directing it toward the luminescent screen in accordance with an electrical quantity to be indicated which may, for example, be a voltage.

For a better understanding of the invention, together with other and further objects thereof, reference is made to the following description, taken in connection with the accompanying drawings, and its scope will be pointed out in the appended claims.

In the accompanying drawings:

Fig. 1 is a schematic circuit diagram, partly in block form, of a frequency measuring system in accordance with the invention including an electronic indicator tube sectioned on line 1—1 of Fig. 3;

Fig. 2 is a graph showing the voltage wave developed across the measuring condenser of one of the counter circuits forming part of the frequency measuring system of Fig. 1;

Fig. 3 illustrates an electronic indicator tube embodying the present invention;

Fig. 4 is a view on enlarged scale taken on line 4—4 of Fig. 3 and illustrating the cathode of the indicator tube;

Fig. 5 is a view taken on line 5—5 of Fig. 3 of the luminescent screen of the indicator tube; and Fig. 6 illustrates another embodiment of the indicator tube of the invention.

Referring to the drawings, in which like components are designated by the same reference numerals throughout the figures, and particularly to Fig. 1, there is illustrated a frequency measuring system comprising source 1 of a wave, the frequency of which is to be measured. In order to measure the frequency of the wave developed by source 1 the number of waves developed by the source is counted for a predetermined interval of time. For the purpose of establishing the predetermined time interval there is provided wave source 2 of which is preferably crystal controlled and the frequency of which is known. The frequency of the wave developed by standard frequency source 2 is divided by frequency divider 3 which operates to develop an output pulse indicated at 4 which has a predetermined duration such, for example, as one second.

The wave of unknown frequency developed by source 1 is impressed upon a normally inoperative gate tube schematically indicated at 5. Gate tube 5 is rendered operative by applying thereto pulse 4 developed by frequency divider 3. Gate tube 5 accordingly passes the wave developed by source 1 for a predetermined time interval which is defined by the length of pulse 4. The output of gate tube 5 is therefore a wave train as indicated at 10. By counting the number of waves passed by gate tube 4, that is, the number of waves of wave train 10, the frequency of source 1 may be determined.

For this purpose there are provided impulse counters 6 and 7 which may be identical. Impulse counters 6 and 7 are of the type disclosed and claimed in copending application Serial No. 665,659, filed on April 29, 1946, now Patent No. 2,583,003, in the name of L. F. Mayle, entitled "Counter Circuit" and assigned to the assignee of the present application. It is, however, to be understood that any conventional impulse counter circuit may be substituted for impulse counters 6 and 7 illustrated in Fig. 1. Preferred impulse counters which may be substituted for those illustrated in Fig. 1 have been disclosed and claimed in copending applications, Serial No. 665,594, now abandoned, to L. F. Mayle entitled "Impulse Counter Circuit" and Serial No. 665,593 to C. E. Hallmark entitled "Pulse Counter," both filed on April 27, 1946 and assigned to the assignee of the instant application.

Impulse counter 6 includes charging condenser 11 and measuring condenser 12 connected in series through resistor 13. Wave train 10 developed by gate tube 5 which represents the wave developed by source 1 and extends over a predetermined period of time, is impressed upon charging condenser 11. Measuring condenser 12 is connected between resistor 13 and ground as illustrated. For the purpose of charging measuring condenser 12 by substantially equal voltage increments in response to input waves 10, there is provided space discharge tube 14 comprising cathode 15, control grid 16 and anode 17 which may be connected to a suitable anode voltage source indicated at B+. For the purpose of providing self-bias, impedance 18 may be provided between cathode 15 and measuring condenser 12. Cathode impedance 18 comprises adjustable resistor 20 and condenser 21 arranged in parallel. Discharge tube 14 is accordingly normally biased to cutoff.

For the purpose of periodically bringing measuring condenser 12 to a predetermined negative potential there is provided blocking oscillator 22 comprising cathode 23, control grid 24 and anode 25. Anode 25 is connected through winding 26 of transformer 27 to anode voltage supply B+. The other winding 28 of transformer 27 is connected between cathode impedance 18 and measuring condenser 12, on the one hand, and control grid 24 of blocking oscillator 22, on the other hand. Cathode resistor 30 of blocking oscillator 22 is provided between cathode 23 and ground as illustrated. The output signal at a reduced frequency may be obtained from output lead 31 connected between cathode 23 and cathode resistor 30. Output lead 31 may be connected to charging condenser 33 of impulse counter 7 which is identical to impulse counter 6.

Input waves or pulses 19 should be of positive polarity and should have an amplitude of the order of 10 volts or more. The output signal obtained from output lead 31 is also of positive polarity. Impulse counter 6 operates as follows. Let it be assumed that initially measuring condenser 12 is driven by blocking oscillator 22 to a high negative potential which may be of the order of 500 volts. To this end the terminal of measuring condenser 12 connected to cathode impedance 18 may be momentarily connected to ground by a switch 35, thereby to discharge condenser 12. This will fire blocking oscillator 22 in a manner to be explained hereinafter and will impress a negative potential upon measuring condenser 12. Since charging condenser 11 and measuring condenser 12 are connected through resistor 13, the voltage on condensers 11 and 12 will equalize so that both condensers will acquire a high negative voltage. Control grid 24 of blocking oscillator 22 is held at this negative voltage by measuring condenser 12, thereby biasing blocking oscillator 22 considerably beyond cutoff. In view of the self-bias voltage developed across cathode impedance 18 discharge tube 14 is also cut off.

Upon the arrival of the leading edge of the first wave of wave train 19 which is of positive polarity, the voltage of charging condenser 11 is raised toward ground, thereby driving control grid 16 positive with respect to cathode 15. Discharge tube 14 will accordingly begin to conduct space current and will charge measuring condenser 12. While tube 14 conducts space current, the voltage of measuring condenser 12 is raised toward ground until discharge tube 14 ceases again to conduct space current. Tube 14 is cut off again as soon as the voltage of measuring condenser 12, that is, of cathode 15 is raised by a sufficient voltage increment which preferably happens before the arrival of the trailing edge of the first input wave. The conduction of discharge tube 14 is controlled by the voltages across charging condenser 11 and measuring condenser 12. The input waves only trigger discharge tube 14, while the major portion of the energy supplied to measuring condenser 12 is furnished by the space current flowing through tube 14.

Upon the arrival of the trailing edge of the first input wave, the voltage across charging condenser 11 is depressed again to a more negative value than its initial voltage, thus driving control grid 16 considerably beyond cutoff. At this time the voltage at the junction point of charging condenser 11 and resistor 13 is negative with respect to that at the junction point between resistor 13 and measuring condenser 12. Accordingly, current will flow from measuring condenser 12 through resistor 13 to charging condenser 11 until the voltages of the two condensers are equal. To minimize the small voltage drop across measuring condenser 12, occurring between the arrival of successive input waves, the capacitance of measuring condenser 12 should preferably be large compared to that of charging condenser 11.

In response to successive input waves the voltage across measuring condenser 12 will increase by substantially equal voltage increments, as illustrated by curve 37 of Fig. 2. After a predetermined number of input waves has been impressed upon charging condenser 11, the voltage across measuring condenser 12 has been raised sufficiently to fire blocking oscillator 22 in view of the fact that measuring condenser 12 is coupled between control grid 24 and cathode 23 of the blocking oscillator. During a cycle of oscillation of blocking oscillator 22, a negative voltage is developed across winding 28 of transformer 27 which is impressed upon measuring condenser 12 and subsequently through resistor 13 upon charging condenser 11. At the same time an output signal is developed across cathode resistor 30 of blocking oscillator 22 which is impressed through output lead 31 upon charging condenser 33 of impulse counter 7.

Although count-down ratios of 70 to 1 have been obtained with an impulse counter such as shown at 6, the counter circuits are preferably arranged to have a count-down ratio of 10 to 1 only so that impulse counters 6 and 7 function as decade counters. The count-down ratio of the impulse counters such as counter 6 is determined principally by the negative voltage impressed at the end of each counting cycle by blocking oscillator 22 upon measuring condenser 12 and upon the voltage increments developed across measuring condenser 12 in response to each input wave. These voltage increments depend in turn upon the voltage of input wave train 10 which accordingly should be of the order of 10 volts or more.

Impulse counter 7 is identical with counter 6 so that no further explanation of its operation is required. An output signal may be obtained from output lead 40 of impulse counter 7 which may, if desired, be applied to the charging condenser of another decade counter identical to impulse counters 6 and 7.

Let it be assumed that impulse counters 6 and 7 are arranged as decade counters. In that case the voltage remaining on the measuring condensers of the impulse counters indicates the number of waves to be counted. Thus, the voltage remaining on measuring condenser 12 of impulse counter 6, which is the first decade counter, indicates the units of the number of waves, while the voltage remaining on measuring condenser 41 of impulse counter 7, which is the second decade counter, indicates the number of waves in units of 10. The voltage remaining on the measuring condenser of a third decade counter would indicate the number of waves in units of 100, etc. Accordingly, in order to obtain an indication of the number of waves contained in wave train 10 all that needs to be done is to measure the voltages remaining on the measuring condensers of the decade counters such as 12 and 41.

For the purpose of exhibiting visually these voltages which, in turn, indicate the number of waves contained in wave train 10 there is provided in accordance with the present invention electronic indicator 45 illustrated in greater detail in Fig. 3. Indicator 45 illustrated in Fig. 1 is a view taken on line 1—1 of Fig. 3. Electronic indicator 45 is provided with cathode 46 which may be connected to the negative terminal of a suitable voltage source, such as battery 47 having its positive terminal grounded, as shown. As illustrated in Fig. 4, cathode 46 may bear photosensitive areas 50, each of which represents a character such as a symbol, a letter or a numeral. As shown in Fig. 4, the photosensitive areas 50 are arranged in a number of adjacent rows 51, 52 and 53, each row representing the numerals from zero to nine, inclusive. It is to be understood that any number of rows of photosensitive areas may be provided, three rows being shown by way of example only.

Photosensitive areas 50 on cathode 46 are energized by light source 55, the light of which may be focused on cathode 46 by lens system 56. Photosensitive areas 50 may be provided on cathode 46 in any suitable manner such, for example, as by embossing. It is also feasible to provide cathode 46 with a continuous photosensitive surface. In that case the desired characters or numerals may be projected by means of light source 55 and lens system 56 on cathode 46 through film 57 which may have transparent areas arranged in rows, each area representing a desired character.

In this manner a plurality of electron beams are developed on electronic indicator 45, each of the beams having a cross section representing a character such as a numeral. The electron beams are focused on luminescent screen 58 by means of focusing coil 60 which may be energized from a suitable current source such as battery 61. Luminescent screen 58 may be grounded as illustrated.

Luminescent screen 58 preferably has a height, as shown in Figs. 3 and 5, which is sufficient to exhibit only one of the numerals represented by areas 50.

In accordance with the present invention the electron beams developed from photosensitive areas 50 are deflected across luminescent screen 58. To this end there are provided deflecting elements or plates 63, 64 and 65 (Fig. 1), each being associated with one row 51, 52 and 53, respectively, of photosensitive areas 50. The second deflecting plate 66 may be common to deflecting elements 63, 64 and 65 and may be grounded as illustrated.

As shown in Fig. 1, deflecting plate 63 of indicator tube 45 is connected to measuring condenser 12 of impulse counter 6 by lead 67. Deflecting plate 63 is associated with row 51 of the photosensitive areas 50. Similarly, deflecting plate 64 associated with row 52 is connected to measuring condenser 41 of impulse counter 7 through lead 68. Lead 69 connected to deflecting plate 65 associated with row 53 may be connected to the measuring condenser of the next decade counter which may be connected to impulse counter 7.

The operation of electronic indicator 45 will now be evident. The voltages remaining on measuring condensers 12 and 41 of impulse counters 6 and 7, respectively, indicate the number of waves of wave train 10. Let it be assumed that wave train 10 includes 275 waves. Impulse counter 6 will accordingly count 275 waves. Every time ten waves have been impressed on counter 6, blocking oscillator 22 will fire so that the oscillator is triggered twenty-seven times. The last five waves impressed on counter 6 will build up a voltage across measuring condenser 12 which therefore corresponds to five steps of staircase wave 37 of Fig. 2. This voltage which remains on condenser 12, is now impressed on deflecting element 63 to deflect the electron beams corresponding to row 51 across luminescent screen 58 until numeral 5 is focused on this screen.

Impulse counter 7 receives twenty-seven input waves or pulses, and accordingly, measuring condenser 41 has a voltage remaining thereon corresponding to seven steps of staircase wave 37. This voltage is impressed on deflecting element 64 to deflect the second row of electron beams corresponding to row 52 across luminescent screen 58 so that numeral 7 will be visible on screen 58. The blocking oscillator of impulse counter 7 is fired twice so that two impulses would be received by an impulse counter connected to counter 7. The voltage remaining on the measuring condenser of a third counter may be impressed through lead 69 on deflecting element 65 to deflect the third row of electron beams corresponding to row 53 across luminescent screen 58 to exhibit the numeral 2, as illustrated in Fig. 5. The numerals 2, 7, 5 appearing on screen 58 and indicating 275 waves of source 1 are therefore exhibited in a horizontal line which greatly facilitates the rapid observation of the result of the measurement.

As pointed out hereinbefore, impulse counters 6 and 7 develop a staircase wave of negative polarity across their respective measuring condensers 12 and 41. Electronic indicator 45 will also operate in connection with a counter circuit wherein a staircase wave of positive polarity is developed. Such an impulse counter has been disclosed, for example, in copending application Serial No. 665,594 to L. F. Mayle referred to hereinabove.

The electronic indicator of the present invention may be utilized for measuring the frequency of a wave of unknown frequency in the manner explained in connection with Fig. 1. Thus, wave source 1 may be an audio source or it may be a frequency standard, the frequency of which is to be checked. The frequency measuring system of Fig. 1 may also be used with advantage for the alignment of receivers, that is, for providing proper tracking between the tuning elements of the receiver and the frequency indication on the dial.

The system of Fig. 1 may furthermore be used for measuring short time intervals. For that purpose gate tube 5 may be directly connected to standard frequency source 2, the frequency of which is known. By opening gate tube 5 during the time interval, the length of which is to be measured, the number of waves developed by standard frequency source 2 may be counted during the unknown time interval. This in turn will give a direct indication of time. One of the main advantages of electronic indicator 45 is that the quantity to be measured is directly indicated on luminescent screen 58 and that all the numerals appear on screen 58 in a horizontal line. It is not necessary to carry out any computations, and the indicator tube may be connected to any number of counter circuits.

The electronic indicator of the present invention may also be connected to an electronic computing device for visually indicating the quantity to be measured. Indicator tube 45 may furthermore be utilized for exhibiting letters in the manner of a teletypewriter. In that case cathode 46 of tube 45 should be provided with one row of photosensitive areas, each area representing a letter of the alphabet. If the input wave impressed upon one of the deflecting elements of the tube has a voltage which is representative of one of the letters in the alphabet, the desired letter will be exhibited on luminescent screen 58 by electrostatic deflection.

Referring now to Fig. 6, there is illustrated a modification of this invention comprising an electronic indicator 70 including cathode 71. Cathode 71 consists of a heat conducting material such as a metallic sheet which is not thermionic emissive. Cathode 71 may be provided in any suitable manner with a number of thermionic emissive areas having predetermined configurations similar to photosensitive areas 50 of cathode 46 (Fig. 4). The thermionic emissive areas provided on cathode 71 may be energized by heater 72 which heats cathode 71 and its thermionic emissive areas and is connected across a suitable current source such as battery 73. The thus developed electron beams may be focused on luminescent screen 74 by focusing coil 60 and may be deflected by deflecting plates 75 in the manner previously explained. Luminescent screen 74 may extend across the entire height of the tube, the undesired electrons being collected by anode 76 having an aperture or slot 77 through which the desired electron beams may pass. Electronic indicator 70 operates in the same manner as indicator 45.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electronic indicator tube comprising a cathode, said cathode including means for developing a plurality of electron beams arranged in adjacent rows each of said beams having a cross section representing a character, a luminescent screen, means for focusing said beam on said screen, a plurality of electrostatic deflecting plates equal in number to the number of rows, each of said plates being mounted in alignment with a separate one of said rows and adapted upon application of a voltage thereto to deflect the beams in its associated row so that a selected one of the beams in this row falls upon the luminescent screen.

2. An electronic indicator tube according to claim 1 wherein the means for developing a plurality of electron beams comprises an equal number of photosensitive areas formed on cathode 46, each of said areas representing a character.

3. In a frequency counting and indicating system, the combination of a plurality of counters connected in cascade for counting the frequency of a given electrical phenomena, each of said counters including a measuring condenser across which a voltage is developed representing the digital value of the denominational order measured by said counter, a frequency indicating tube comprising a plurality of electron beam emitters arranged in rows, each row corresponding to a given denominational order and each emitter in a given row representing a different digit, a plurality of separate deflecting electrodes each ailgned with a separate one of said rows and adapted to deflect the beams of said row, a luminescent member towards which all of said beams are directed, and means for applying the voltage from each of said condensers to a separate corresponding one of said deflecting electrodes to deflect the beams in each row according to the potential of the condenser so that a selected beam in each row strikes the luminescent material.

JOSEPH C. FERGUSON.

REFERENCES CITED

The following references are of record in the file of this patent:

UNITED STATES PATENTS

| Number | Name | Date |
|---|---|---|
| 1,072,426 | Claflin | Sept. 9, 1913 |
| 2,267,827 | Hubbard | Dec. 30, 1941 |
| 2,283,383 | McNaney | May 19, 1942 |
| 2,310,105 | Michel | Feb. 2, 1943 |
| 2,354,768 | Nokes | Aug. 1, 1944 |
| 2,405,597 | Miller | Aug. 13, 1946 |
| 2,422,698 | Miller | June 24, 1947 |
| 2,436,963 | Crosdoff | Mar. 2, 1948 |
| 2,455,639 | Anderson | Dec. 7, 1948 |

FOREIGN PATENTS

| Number | Country | Date |
|---|---|---|
| 355,705 | Great Britain | Aug. 24, 1931 |